United States Patent [19]

Doornbos et al.

[11] 4,022,920

[45] May 10, 1977

[54] FLAVORING WITH AMADORI COMPOUNDS

[75] Inventors: Tamme Doornbos, Doetinchem; Godefridus Antonius Maria van den Ouweland, Zevenaar, both of Netherlands

[73] Assignee: Lever Brothers Company, New York, N.Y.

[22] Filed: July 2, 1975

[21] Appl. No.: 592,489

[30] Foreign Application Priority Data

July 2, 1974 United Kingdom ............ 29306/74

[52] U.S. Cl. .............................. 426/533; 426/534
[51] Int. Cl.$^2$ ....................................... A23L 1/226
[58] Field of Search ................. 426/533, 534, 537

[56] References Cited

UNITED STATES PATENTS 2,446,478  8/1948  Kremers ..................... 426/533

FOREIGN PATENTS OR APPLICATIONS 48-25508  1/1973  Japan

*Primary Examiner*—Joseph M. Golian
*Attorney, Agent, or Firm*—James J. Farrell; Melvin H. Kurtz; Kenneth F. Dusyn

[57] ABSTRACT

A creamy, buttery flavor or aroma with a pleasant note, reminiscent of bread is imparted to foodstuffs by heating them under controlled conditions in the presence of Amadori rearrangement compounds, having a melting point below 170° C, of 6-deoxy-aldohexoses, such as e.g. rhamnose, and alpha-amino acids, such as e.g. proline. Frying and cooking fats, including margarine, comprising these Amadori compounds are also described.

9 Claims, No Drawings

FLAVORING WITH AMADORI COMPOUNDS

The present invention relates to flavouring precursor compositions or flavouring precursor additives comprising Amadori rearrangement compounds of 6-deoxy-aldohexoses and certain alpha-amino acids and to a process of preparing such flavouring precursor compositions or flavouring precursor additives.

The invention further relates to, as a novel composition, a foodstuff or an ingredient for foodstuffs comprising Amadori rearrangement compounds of 6-deoxy-aldohexoses and certain alpha-amino acids. More particularly the invention relates to frying and cooking fats, including margarine, comprising the Amadori rearrangement compounds of 6-deoxy-aldohexoses and certain alpha-amino acids.

The present invention also relates to a method of imparting to a foodstuff or an ingredient for a foodstuff a creamy, buttery flavour or aroma with a pleasant note reminiscent of bread by heating the foodstuff or the ingredient for the foodstuff in contact with an Amadori rearrangement compound of 6-deoxy-aldohexoses and certain alpha-amino acids.

The present invention further relates to a process of altering the existing flavour or aroma of foodstuffs or ingredients for foodstuffs by heating the foodstuff or the ingredient for the foodstuff under controlled conditions in contact with Amadori rearrangement compounds of 6-deoxy-aldohexoses and certain alpha-amino acids.

Finally the present invention relates to a method of imparting to a foodstuff a creamy, buttery flavour or aroma with a pleasant note reminiscent of bread by frying or cooking said foodstuff with frying or cooking fats, including margarine, comprising the Amadori rearrangement compounds of 6-deoxy-aldohexoses and certain alpha-amino acids before consumption.

By the term "alter" is to be understood throughout this specification and the appended claims, to augment an existing flavour or aroma characteristic where it is deficient in some respect, or to supplement the existing flavour or aroma impression to modify or enhance its quality, character or taste.

By the term "foodstuff" is to be understood throughout this specification and the appended claims a solid, semi-solid or liquid, ingestible material which usually, but not necessarily, has a nutritional value. The foodstuff also may be a concentrated foodstuff.

By the term "ingredient for foodstuffs" is to be understood throughout this specification and the appended claims, a solid, semi-solid or liquid, ingestible material which constitutes a component of the formulation or recipe of a foodstuff or an addition to a foodstuff and which may be added at any stage in the preparation of the ready-to-eat foodstuff.

The term "fat" is used to include throughout this specification and the appended claims not only the normally solid fatty acid glycerides, commonly termed "fats", but also the normally liquid fatty acid glycerides, commonly termed "oils". "Normally" means at a temperature of 20° C. It will be understood that the frying or cooking fats used must be edible fats. The fats can also have been subjected to one or more treatments known per se for such fats, such as hydrogenation, interesterification or fractionation in any desired sequence of treatments. Also mixtures of fats may be used.

By the term "margarine" is to be understood throughout this specification and the appended claims an edible emulsion of fat and water, preferably of the water-in-oil type.

It has surprisingly been found that if the Amadori rearrangement compounds of the 6-deoxy-aldohexoses and certain alpha-amino acids are heated under controlled conditions they yield a mixture of compounds which, when present in a foodstuff or an ingredient for a foodstuff in a minor proportion, impart to that foodstuff or ingredient for a foodstuff a rich, full aroma and/or flavour which is reminiscent of cream and/or butter with a pleasant note, reminiscent of bread.

Accordingly the present invention provides a flavouring precursor composition or flavouring precursor additive comprising at least one Amadori rearrangement compound of a 6-deoxy-aldohexose and certain alpha-amino acids, and a process of preparing such flavouring precursor compositions or additives.

Moreover the present invention provides, as a novel composition, a foodstuff or an ingredient for foodstuffs comprising at least one Amadori rearrangement compound of a 6-deoxy-aldohexose and certain alpha-amino acids. More particularly, the invention provides frying and cooking fats, including margarine, comprising at least one of the Amadori rearrangement compounds of a 6-deoxy-aldohexose and certain alpha-amino acids.

Furthermore, the present invention provides a method of imparting to a foodstuff or an ingredient for a foodstuff a creamy, buttery flavour and/or aroma with a pleasant note reminiscent of bread by heating the foodstuff or the ingredient for the foodstuff in contact with at least one Amadori rearrangement compound of a 6-deoxy-aldohexose and certain alpha-amino acids.

The present invention also provides a process of altering the existing flavour and/or aroma of foodstuffs or ingredients for foodstuffs by heating the foodstuff or ingredient for foodstuffs in contact with at least one Amadori rearrangement compound of a 6-deoxy-aldohexose and certain alpha-amino acids.

Finally the present invention provides a method of imparting to a foodstuff a creamy, buttery flavour and/or aroma with a pleasant note reminiscent of bread by frying or cooking said foodstuff with cooking or frying fats, including margarine, comprising at least one Amadori rearrangement compound of a 6-deoxy-aldohexose and certain alpha-amino acids before consumption.

The Amadori rearrangement reaction is known per se and is described e.g. by J. E. Hodge in Advances in Carbohydrate Chemistry, Vol. 10,161–205 (1955 ; Academic Press, New York) and in The Merck Index, Eighth Edition, 1968, p. 1139. The preparation of e.g. Amadori rearrangement compounds derived from glucose has been described by E. F. L. J. Anet in Australian J. Chem. 10, 193–197 (1957).

In general amino acids or their salts are heated with an aldose in a suitable solvent, e.g. methanol, to produce an aldosylamine, which is rearranged into the Amadori rearrangement compound. While the reaction will occur at room temperature, heating may be applied in which the temperature is dependent on the solvent used. The aldosylamine need not be isolated. In the rearrangement reaction the amino acids supply the protons and no other acid need be added.

In preparing the Amadori compounds to be used according to the present invention, the reducing sugar or aldose is selected from the group consisting of the 6-deoxy-aldohexoses. Examples of these sugars are 6-deoxy-L- or D-mannose (L- or D-rhamnose), 6-deoxy-L- or -D-galactose (L- or D-fucose), 6-deoxy-L- or -D-glucose (L- or D-quinovose). Rhamnose, fucose and quinovose are preferred. Also mixtures of 6-deoxy-aldohexoses may be used.

As the sugars possess asymmetric carbon atoms, they may be laevo- or dextro-rotatory, or may be a mixture of both isomeric forms. It will be understood that all these possible isomeric forms are encompassed within the scope of the present invention.

The amino acids used in the preparation of the Amadori rearrangement compounds to be used in the present invention are alpha-amino acids. In general the naturally occurring alpha-amino acids are preferred. The alpha-amino acids to be used are selected in such a way that the resulting Amadori rearrangement compound, obtained from the reaction of the alpha-amino acid with the 6-deoxy-aldohexose, has a melting point of below about 170° C. Examples of preferred alpha-amino acids are proline, hydroxyproline, serine and alpha-aminobutyric acid.

Also mixtures of the alpha-amino acids may be used.

Most of the amino acids have an asymmetric carbon atom and hence may be laevo- or dextro-rotatory, or may be a mixture of both isomeric forms. It will be understood that all these possible isomeric forms are encompassed within the scope of the present invention.

The Amadori compounds can be isolated from their reaction mixture in substantially pure form, but may also be purified by conventional purification techniques.

The flavouring precursor composition or additive comprising the Amadori rearrangement compounds according to the present invention can be used to impart flavour or aroma to foodstuffs or ingredients for foodstuffs by incorporation or the flavouring precursor composition or additive in the foodstuff or the ingredient for the foodstuff and heating them under controlled conditions, i.e. heating them to a temperature of at least about 90° C for a certain period of time, which generally is of the magnitude of about 30 minutes before their consumption. It will be clear that this heating step may take place at any stage of the preparation of the foodstuffs or ingredients for foodstuffs after the incorporation of the Amadori rearrangement compounds and before their final consumption.

The flavouring precursor compositions can also be used to alter the flavour or aroma of foodstuffs or ingredients for foodstuffs, which have to be heated under the said controlled conditions before their final consumption.

The flavouring precursor compositions or additives herein described can be prepared according to conventional techniques, well-known in the art for this purpose. They may be solid, semi-solid, liquid or emulsified depending upon the desired physical form of the foodstuff or the ingredient for the foodstuff. If desired, the Amadori rearrangement compounds may also be temporarily protected from any chemical or physical action by coating, encapsulation and the like well-known techniques. They may also be incorporated in edible carriers, diluents or any other edible vehicles, such as e.g. also aromatizing, flavouring or spicing preparations or concentrates.

In the provision, as a novel composition, of a foodstuff or ingredient for foodstuffs, also comprising frying and cooking fats, including margarine, at least one of the Amadori rearrangement compounds may be incorporated as such in the foodstuff or ingredient for the foodstuff, also comprising the cooking or frying fat, or in edible, carriers, diluents or any other edible vehicle. If incorporated in margarine, they may be added to the fatty phase or to the aqueous phase at any stage in the manufacture of the margarine, provided that the process steps do not lead to premature development of the aroma out of the Amadori rearrangement compounds. Also mixtures of different Amadori rearrangement compounds may be used for this purpose.

In the method of imparting to a foodstuff or an ingredient for a foodstuff a creamy, buttery flavour and/or aroma with a pleasant note reminiscent of bread, the foodstuff or the ingredient for the foodstuff is heated under the said controlled conditions in contact with at least one Amadori rearrangement compound of a 6-deoxy-aldohexose and certain alpha-amino acids. To this purpose also the flavouring precursor compositions or the flavouring precursor additives according to the present invention may be used. Prior to the heating, the Amadori rearrangement compounds can be added to or incorporated into the foodstuff or the ingredient for the foodstuff at any convenient point in the production of the finished or ready-to-eat products. This addition or incorporation may be carried out in a manner known per se in general and specifically for the said foodstuff or ingredient involved.

In the process of altering the flavour or aroma of foodstuffs or ingredients for foodstuffs by heating the foodstuff or the ingredients for the foodstuff under controlled conditions in contact with at least one Amadori rearrangement compound of a 6-deoxy-aldohexose and certain alpha-amino acids, this may be carried out as described above for the method of imparting said flavour to foodstuffs or ingredients for foodstuffs.

It will be understood that the type of flavour obtained in its note is dependent upon the specific alpha-amino acid (or amino acids) used in preparation of the Amadori rearrangement compound.

The method of imparting to a foodstuff a creamy, buttery flavour and/or aroma with a pleasant note reminiscent of bread by cooking or frying of the foodstuff with the cooking or frying fats, including margarine, comprising the Amadori rearrangement products according to the present invention, is an operation which is known per se. Any cooking and/or frying treatment may be carried out, provided the temperature in the treatment is high enough, i.e. at least about 90° C, to provoke the aroma and flavour development. Accordingly, this invention is useful with foodstuffs or concentrated foodstuffs which are pasteurized, sterilized, cooked and/or fried in the presence of the cooking or frying fat, including margarine. Examples of foodstuffs are e.g. bakery products, gravies, sauces.

It will be understood that the amounts of Amadori rearrangement compounds to be used to provide the desired flavour and aroma characteristics can be varied widely. Thus, the Amadori rearrangement compounds can be utilized in foodstuffs in amounts from about 1 part per million (ppm) to about 500 ppm calculated on the foodstuff in the ready-for-consumption form. Very good results have been obtained in the range from 5 to 100 ppm. As these concentrations apply in the case of foods ready for consumption, it will be obvious that where more concentrated foodstuffs are involved, appreciably higher concentrations may be used, dependent on the degree of dilution they undergo during preparation for consumption.

In order to obtain products with a still fuller taste and flavour or a specific desirable note, the Amadori rearrangement compounds may be utilized together with other substances acting e.g. as flavourants, flavour intensifiers, potentiators or boosters, sweeteners.

The dosage of these optional ingredients is dependent on the kind of foodstuff and the kind of flavour or aroma one wishes to obtain, as well as on the other ingredients added, such as herbs, spices, extractives, preservatives, antioxidants, buffers and neutralizing agents, enzymes and nutrient supplements.

The invention will now be illustrated by the following Examples.

EXAMPLE I

In a 250 ml three-necked flask carrying a thermometer, a stirrer and a dropping funnel, 8.2 g of 6-deoxy-D-galactose and 7.13 g of L-proline in 75 ml of 96% ethanol were stirred for 3 hours while refluxing under a nitrogen atmosphere.

The solution was then concentrated in a water jet vacuum to approximatively 25 ml, diluted with 20 ml of water and the resulting solution was passed through a column of BIO-RAD AG 50W-X8. Elution with a solution of 0.1 N trichloro-acetic acid yielded a number of fractions which contained the desired Amadori rearrangement compound. These fractions were combined and continuously extracted with ether to remove the trichloro-acetic acid. The resulting aqueous solution was then evaporated to dryness and the residual oil was crystallized from 20 ml of ethanol at −30° C. Total yield 5.4 g (42% of the theoretical amount) with m.p. 146–147° C (decomp.).

Infrared adsorptions (in KBr disc.) were at 3240, 3080, 3030, 2990, 2975, 2938, 2920, 1615, 1445, 1400, 1350, 1335, 1320, 1308, 1290, 1265, 1242, 1230, 1215, 1195, 1165, 1148, 1130, 1120, 1105, 1049, 1025, 1005, 960, 950, 920, 910, 890, 845, 810, 740, 660, 630, 580, 540, 498, 480 cm$^{-1}$.

The NMR spectrum [in $O_2O$, internal standard 1, 1, 2, 2-tetradeutero-3-(trimethylsilyl)-sodium propionate] had signals at (proline part), $\delta = 4.10$ ppm (doublet of a doublet, $\delta = 1.95$ (multiplet), $\delta = 3.32$ (multiplet), $\delta = 2.15$ (multiplet); $\delta = 2.43$ (multiplet), $\delta = 3.92$ (multiplet); (fucose part), $\delta = 3.37$ (doublet), $\delta = 3.50$ (doublet); $\delta = 4.35$ (doublet), $\delta = 4.16$ (doublet), $\delta = 4.17$ (doublet of a doublet), $\delta = 4.34$ (multiplet), $\delta = 1.28$ (doublet) and $\delta = 1.26$ (doublet).

EXAMPLE II

In the same apparatus as described in Example I, 1.64 g of 6-deoxy-D-glucose and 1.73 g of L-proline were refluxed for 3 hours in 15 ml of 96% ethanol while stirring under a nitrogen atmosphere.

The reaction mixture was concentrated and passed through a column of BIO-RAD AG 50W-X8 (50-100 mesh). Ion exchange chromatography and working up on the eluate yielded one main product which was crystallized from ethanol-aceton (50/50). Yield 1.6 g (61% of the theoretical amount) with m.p. 138°–139° C (decomp.) $[\alpha]_D^{20} - 34.9°$ (no mutarotation; in water).

Infrared absorptions (in KBr disc.) were at 3420, 3300, 3050, 2980, 2940, 2915, 1718, 1628, 1490, 1458, 1418, 1390, 1377, 1365, 1340, 1325, 1315, 1305, 1265, 1225, 1200, 1150, 1133, 1124, 1110, 1085, 1075, 1050, 987, 961, 935, 870, 827, 820, 768, 723, 695, 640, 548, 523, 480, 430 cm$^{-1}$.

The NMR spectrum [in $D_2O$, internal standard 1, 1, 2, 2 -tetradeutero-3-(trimethylsilyl)-sodium propionate] had signals at: (proline part) $\delta = 4.19$ ppm (doublet of a doublet), $\delta = 2.12$, $\delta = 3.32$, $\delta = 1.44$, $\delta = 2.44$ and $\delta = 3.97$; (D- quinovose part), $\delta = 3.45$ (doublet), $\delta = 3.52$ (doublet), $\delta = 3.50$, $\delta = 4.17$ (doublet), $\delta = 3.98$ (doublet), $\delta = 3.75$ (doublet of a doublet), $\delta = 3.87$, $\delta = 4.09$ (multiplet), $\delta = 3.83$ and $\delta = 1.325$.

EXAMPLE III

In the same apparatus as described in Example I, 10.92 g of 6-deoxy-L(+)-mannose and 13.8 g of L-proline were heated for 8 hours in 100 ml of 96% ethanol while stirring under a nitrogen atmosphere. The reaction mixture was worked up as described in Example I and the Amadori rearrangement compound isolated by crystallization from ethanol. Yield 4.9 g (32% of the theoretical amount) with m.p. 141°–141.5° C (decomp.).

Infrared absorptions (in KBr disc.) were at 3280, 3080, 2985, 2938, 2885, 1630, 1455, 1440, 1395, 1360, 1345, 1325, 1310, 1240, 1210, 1195, 1175, 1145, 1125, 1115, 1085, 1048, 1030, 1004, 958, 940, 925, 895, 865, 850, 820, 780, 720, 640, 575, 530, 485, 470 and 415 cm$^{-1}$. The NMR spectrum [in $D_2O$; internal standard 1, 1, 2, 2, -tetradeutero-3-(trimethylsilyl)-sodium propionate] had signals at: (proline part) $\delta = 4.19$ ppm (doublet of a doublet), $\delta = 4.15$ ppm (doublet of a doublet), $\delta = 1.91$ (multiplet), $\delta = 3.27$ (multiplet), $\delta = 2.14$ (multiplet), $\delta = 2.41$ (multiplet) and $\delta = 3.84$ (multiplet); (L-rhamnose) $\delta = 3.48$ (doublet), $\delta = 3.43$ (doublet), $\delta = 3.57$ (doublet), $\delta = 3.54$ (doublet), $\delta = 4.17$ (doublet), $\delta = 3.96$ (doublet), $\delta = 3.79$ (doublet of a doublet), $\delta = 3.86$ (multiplet), $\delta = 4.08$ (multiplet), $\delta = 3.83$ (multiplet), $\delta = 1.33$ (doublet) and $\delta = 1.31$ (doublet).

EXAMPLE IV

In the same apparatus as described in Example I, 5.46 g of 6-deoxy-L(+)-mannose, 1.58 g of L-serine and 0.81 g of sodium methoxide were refluxed for 8 hours in 100 ml of methanol while stirring under a nitrogen atmosphere. Working up of the reaction mixture as described in Example I afforded the Amadori rearrangement compound, which was crystallized from a 50/50 mixture of ethanol and acetone. Yield 0.9 g (12% of the theoretical amount) with m.p. 78°–80° C.

Infrared absorptions (in KBr disc.) were at 3360, 2980, 2940, 1630, 1450, 1390, 1050 and 830 cm$^{-1}$.

The NMR spectrum [in $D_2O$; internal standard 1, 1, 2, 2, -tetradeutero-3-(trimethylsilyl)-sodium propionate] had signals at: (serine part) $\delta = 3.8-4.0$ (multiplet); (L-rhamnose part) $\delta = 3.34$ (doublet), $\delta = 3.41$ (doublet), $\delta = 4.20$ (doublet), $\delta = 3.77$ (doublet of a doublet), $\delta = 4.14$ (multiplet) and $\delta = 1.34$ (doublet).

EXAMPLE V

In the same apparatus as described in Example I, 1.09 g of 6-deoxy-L(+)-mannose and 0.31 g of L-alpha-amino-butyric acid were refluxed for 20 hours in 10 ml of methanol while stirring under a nitrogen atmosphere. The reaction mixture was then worked up as described in Example I and the Amadori rearrangement compound isolated by crystallization from a 50/50 mixture of ethanol and acetone. Yield 0.1 g (13% of the theoretical amount with m.p. 125°–126° C (decomp.)).

Infrared absorptions (in KBr disc.) were at 3350, 1610, 1450, 1385, 1120, 1080, 1045, 980, 830, 805 cm$^{-1}$.

The NMR spectrum [in $D_2O$; internal standard 1, 1, 2, 2,-tetradeutero-3-(trimethylsilyl)-sodium proprionate] had signals at: (alpha-aminobutyric acid part) $\delta =$ 3.70 (triplet), $\delta = 1.90$ (multiplet), $\delta = 0.93$ (triplet); (rhamnose part), $\delta = 3.29$ (singlet), $\delta = 3.25$ (singlet), $\delta = 4.17$ (doublet), $\delta = 4.01$ (doublet), $\delta = 3.77$ (doublet of a doublet), $\delta = 3.90$ (multiplet), $\delta = 4.11$ (multiplet), $\delta = 3.87$ (multiplet), $\delta = 1.29$ (doublet) and $\delta = 1.28$ (doublet).

EXAMPLE VI

A solution of 1.80 g of 6-deoxy-D(+)-galactose and 1.31 g of L(−)-hydroxyproline in 25 ml of acetic acid was kept at 60° C for 4 days. The solution was evaporated under vacuum and the residue obtained was dissolved in water and subsequently passed through a column with BIO-RAD AG 50W-X8. Elution with 0.3N trichloroacetic acid gave a number of fractions comprising the Amadori rearrangement compound. The fractions were combined and the trichloroacetic acid was removed by continuous extraction with ether. The resultant aqueous solution was evaporated under vacuum and the residue (an oil) was dissolved in methanol. The methanolic solution was poured out into acetone upon which a precipitate was formed. The precipitate was recrystallized from a mixture of methanoe and ethanol. 2.0 g of the Amadori rearrangement compound, having a melting point of 146.5–147.5 degrees celsius (decomp.), were obtained (72% of the theoretical amount).

Infrared absorptions were at: 3600–2500, 3490, 3315, 3240, 3050, 3010, 2990, 2980, 2910, 2840, 2700, 1645, 1620, 1450, 1390, 1350, 1340, 1315, 1300, 1280, 1260, 1230, 1220, 1195, 1170, 1165, 1140, 1130, 1120, 1100, 1090, 1080, 1045, 1030, 1015, 1000, 975, 950, 900, 885, 860, 840, 795, 750, 720, 680, 650, 550 and 520 cm$^{-1}$.

EXAMPLE VII

To a commercially available, flavoured margarine (Sample A : blank) the following amounts of Amadori rearrangment compounds were added:

Sample B : A + 20 ppm Amadori rearrangement compound of Example III

Sample C : A + 20 ppm Amadori rearrangement compound of Example I.

The samples A, B and C were heated to 160° C, diluted with water (in a ratio 50 g of margarine/16.6 g of water) and the gravy obtained was evaluated by tasting by a panel in a pair test. Test results (also in the following Examples) have been evaluated using the (right-hand) onesided sign test critical values. The results were as follows:

A versus B : 13 out of 19 preferred B
A versus C : 11 out of 14 preferred C
B versus C : no preference

EXAMPLE VIII

To a commercially available, flavoured margarine (Sample A : blank) the following amounts of Amadori rearrangement compounds were added:

Sample B : A + 40 ppm of Amadori rearrangement compound of Example V

Sample C : A + 40 ppm of Amadori rearrangement compound of Example IV

Sample D : A + 40 ppm of Amadori rearrangement compound of Example III.

The samples A, B, C and D were heated to 160° C, diluted with water (in a ratio 50 g of margarine/16.6 g of water) and the gravy obtained was evaluated by tasting by a panel in a pair test. The results were as follows:

A versus B : 13 out of 17 preferred B
A versus C : 12 out of 14 preferred C
A versus D : 10 out of 13 preferred D.

EXAMPLE IX

As it is known that some Amadori rearrangement compounds, such as e.g. 1-deoxy-1-piperidino-D-fructose, upon pyrolysis do give rise to the formation of 2,5-dimethyl-4-hydroxy-3(2H)-furanone, and experiment was carried out to investigate whether the formation of the creamy, buttery flavour or aroma with a pleasant note reminiscent of bread might be caused by the possible formation of this furanone.

To this purpose a shortcake dough was prepared with the following ingredients:

|   | grams |
|---|---|
| flour | 422 |
| sugar | 240 |
| margarine | 330 |
| salt | 4 |
| baking powder | 4 |
|   | 1000 |

The margarine and the sugar were mixed in a Hobart mixer (type: CE 100) for 3 minutes at speed 2. Thereafter the flour, salt, baking powder and 20 mg of 2,5-dimethyl-4-hydroxy-3-[2H] - furanone were added, after which the composition was mixed for 10 minutes.

The dough was spouted on baking trays in the shape of piped shortcakes and baked for 17 minutes at 200° C.

In an analogous way piped shortcakes were prepared in which, however, instead of the 2,5-dimethyl-4-hydroxy-3-[2H]-furanone, 80 mg of the Amadori rearrangement compound prepared from D-fucose and L-proline were added to the dough. This amount of Amadori rearrangement compound was taken on the assumption that the furanone was formed indeed upon heating of the Amadori compound. In that case 20 mg of the furanone would have been formed out of 80 mg of the Amadori compound. The shortcakes thus prepared were evaluated by a panel consisting of 24 members in a pair test.

The shortcakes to which the Amadori rearrangement compound was added were preferred by 18 members, because of its fuller, natural butter-like character.

EXAMPLE X

Simple pancakes were baked in a commercially available cooking oil by heating the oil to 160°–170° C and subsequently baking the batter in the heated oil until a light brown pancake was obtained. An equal number of pancakes was prepared in two series. In the one series they were baked in the cooking oil whereas in the other series they were worked in the same cooking oil to which 40 ppm of the Amadori rearrangement compound prepared in Example I had been added.

The pancakes obtained were compared as to taste and flavour by a panel consisting of 11 members, which all preferred the pancakes baked in the oil with the added Amadori rearrangement compound.

EXAMPLE XI

A number of whole eggs was whipped till a homogeneous mixture was obtained. From this mixture fried eggs were prepared by baking them in: (1) a commercially available, flavoured cooking fat (sample A) and (2) A + 40 ppm of the Amadori rearrangement compound of Example I (sample B).

The fried eggs obtained were evaluated by tasting by a panel consisting of 12 members. 10 out of these 12 members preferred the eggs fried in sample B.

EXAMPLE XII

Deep-frozen, pre-fried chips were fried in a commercially available frying oil. The oil was first heated to 180°–190° C, after which the pre-fried chips were added. A same amount of deep-frozen, pre-fried chips was fried in the same commercially available frying oil, to which 40 ppm of the Amadori rearrangement compound prepared in Example I had been added.

The chips finally obtained were evaluated as to taste and flavour by a panel consisting of 8 members. 7 out of them preferred the chips fried in the oil with the Amadori rearrangement compound.

EXAMPLE XIII

To a commercially available, flavoured margarine (sample A : blank) the following amount of Amadori rearrangement product was added:
Sample B : A + 20 ppm of Amadori rearrangement compound of Example VI.

Both samples A and B were heated to 150° C and then evaluated on taste and aroma by a panel in a pair test. The results were as follows:
A versus B : 7 out of 9 preferred B

EXAMPLE XIV

In Japanese Patent Specification No. 25,508/1973 a method of improving the flavour of foods has been described by adding a flavouring agent, which is made by heating a mixture of a 6-deoxy-hexose, such as rhamnose or fucose, together with an amino acid in a closed state. Preferably rhamnose and proline are used. In order to compare the result obtained in the method according to the Japanese Patent Specification and the product obtained according to the present invention, the following comparative example was carried out: A mixture of 1.15 g of L(−)-proline and 2.18 g of L(+)-rhamnose in 4.50 ml of water was heated in a pressure-resistant, sealed ampoule at 128° C for 50 minutes. The dark-brown, turbid solution obtained has a bread-like odour. The product was investigated by means of thin-layer chromatography (on silica gel, using tetrahydrofuran:water=85:15 vol/vol as a solvent). No Amadori rearrangement product of rhamnose and proline could be detected. Upon detection spots were obtained having the same $R_f$-values as proline and rhamnose. The reaction mixture was subsequently stored at room temperature (20° C) for 3 days. After this period the aroma of the mixture appeared to have been deteriorated appreciably.

FLAVOUR/AROMA EVALUATION

To a commercially available, flavoured margarine (Sample A : blank) the following amounts of aromatizing substance were added:
Sample B : A + 40 ppm of the Amadori rearrangement compound of Example III.
Sample C : A + 94 ppm of the reaction mixture obtained as described above (containing 40 ppm dry matter).

All samples were heated to 150° C and then evaluated on taste and aroma by a panel in a pair test. The results were as follows:
A versus B : See result as obtained in Example VIII.
B versus C : 6 out of 7 preferred Sample B
Sample C was rejected by the majority of the panel because of its gingerbread-like odour.
Sample B had a fuller, pleasant caramel-like odour.

We claim:
1. A process for preparing a foodstuff having an improved flavor when heated to a temperature of at least about 90° C comprising admixing the foodstuff or at least one ingredient of the foodstuff with at least one Amadori rearrangement compound in an amount of from about 1 to about 500 parts per million calculated on the foodstuff in the ready-for-comsumption form, said Amadori rearrangement compound having a melting point below about 170° C and being prepared by reacting at least one 6-deoxy-aldohexose with at least one naturally occurring alpha-amino acid, at a temperature below about 90° C.

2. A process according to claim 1 in which the 6-deoxy-aldohexose is selected from the group consisting of rhamnose, fucose and quinovose.

3. A process according to claim 1 in which the amount is from about 5 to about 100 parts per million.

4. A process according to claim 1 in which said naturally occurring alpha-amino acid is selected from the group consisting of proline, hydroxyproline, serine and alpha-amino butyric acid.

5. A process according to claim 1 in which the foodstuff is selected from the group consisting of frying fat, cooking fat, margarine, and other edible emulsions of fat and water.

6. A foodstuff prepared by the process of claim 1.

7. A foodstuff prepared by the process of claim 5.

8. A process for imparting an improved flavor to a foodstuff comprising
1. admixing at least one ingredient of the foodstuff with at least one Amadori rearrangement compound having a melting point below about 170° C, said Amadori rearrangement compound being prepared by reacting at least one 6-deoxy-aldohexose with at least one naturally occurring alpha-amino acid at a temperature below about 90° C either during or after preparation of said foodstuff to form an admixture containing about 1 to about 500 parts of the Amadori rearrangement compound per million parts of the foodstuff, and
2. heating the admixture obtained to a temperature of at least about 90° C in order to decompose the Amadori rearrangement compound.

9. A process of altering the flavor or aroma of foodstuffs which comprises frying or cooking a foodstuff in the presence of the product of claim 7.

* * * * *